June 19, 1951  L. S. KING ET AL  2,557,228
CHASSIS INVERTING DEVICE
Filed Nov. 13, 1945  4 Sheets-Sheet 1

Inventors
LILBERN S. KING,
JACK D. KAYLOR,
By
Shreve, Crown & Gordon
Attorneys

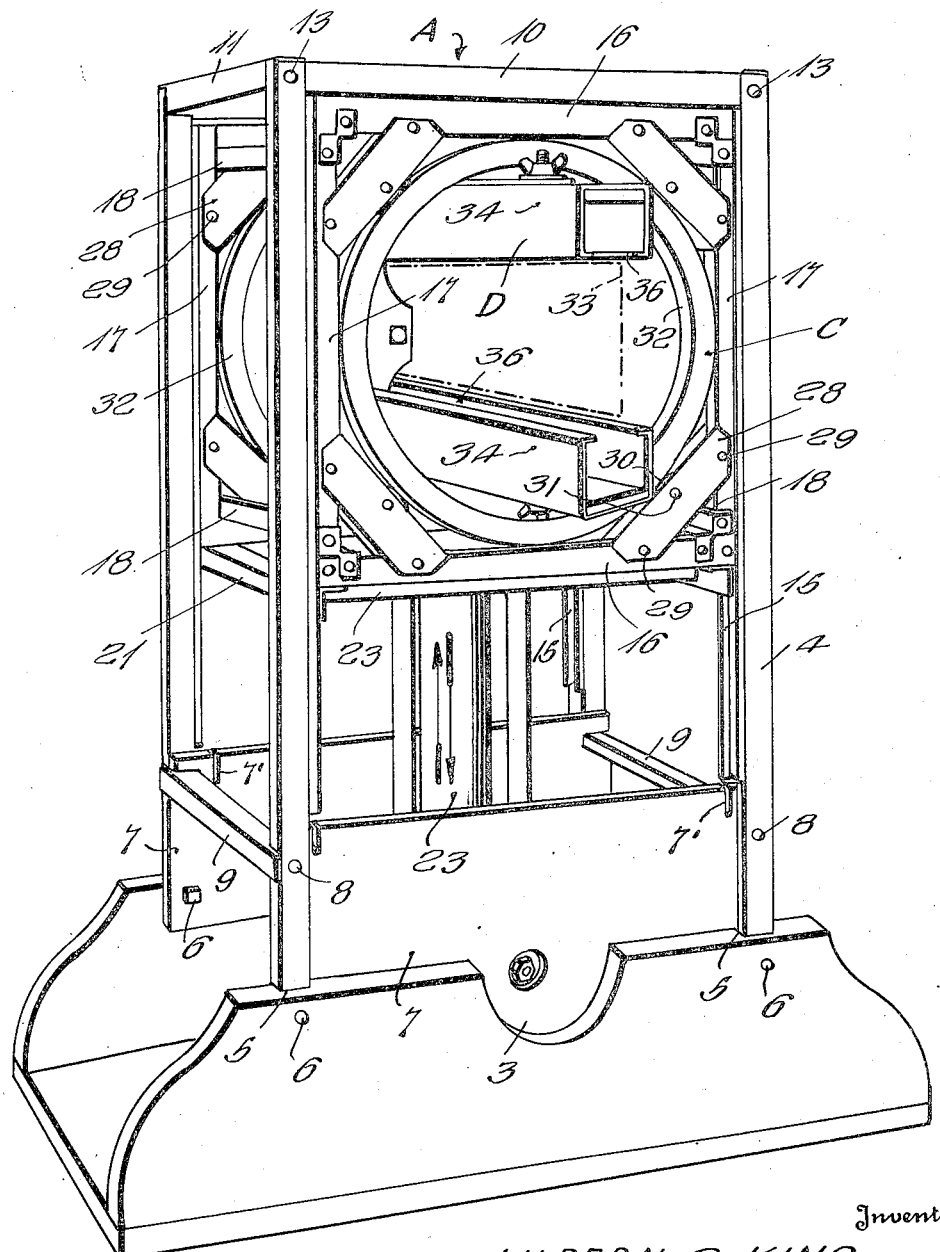

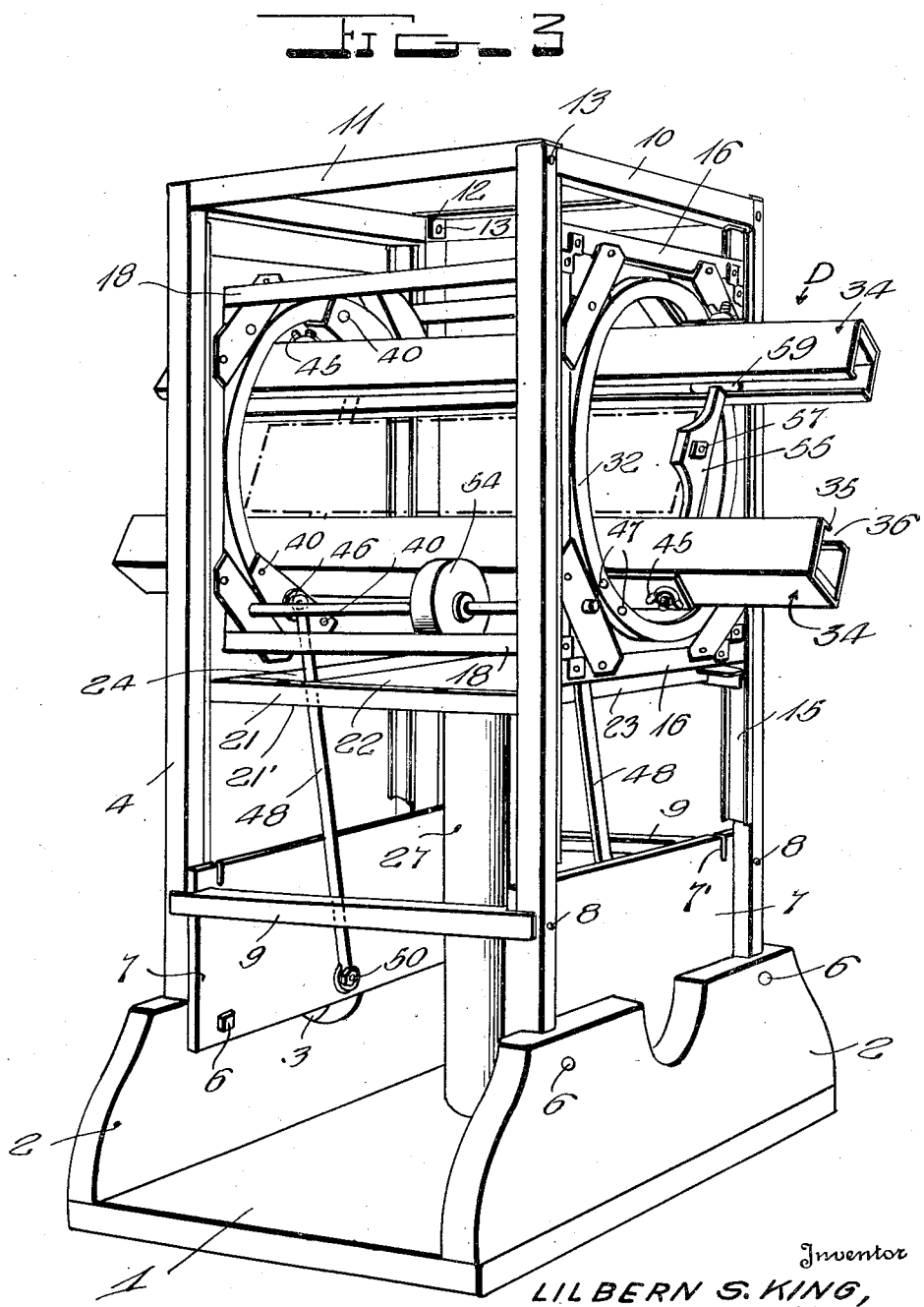

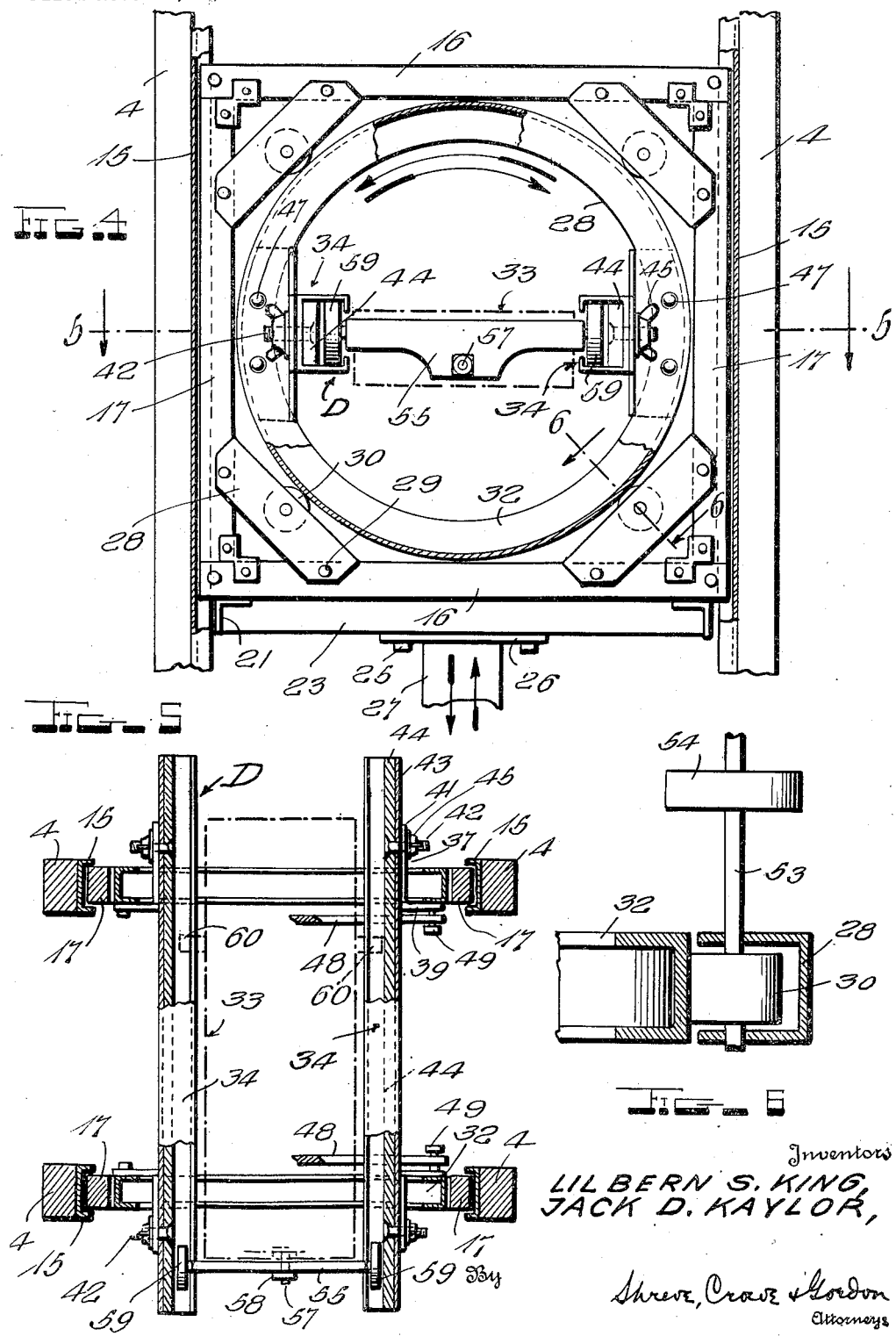

Patented June 19, 1951

2,557,228

UNITED STATES PATENT OFFICE 2,557,228

CHASSIS INVERTING DEVICE

Lilbern S. King and Jack D. Kaylor, Atlanta, Ga., assignors of one-third to J. C. Murphy, Atlanta, Ga.

Application November 13, 1945, Serial No. 628,198

5 Claims. (Cl. 214—1)

Generically this invention relates to a device for inverting an object during course of being worked upon, and it is more particularly directed to such a device adapted to be mounted in a production line for supporting and inverting an automobile chassis.

One of the principal objects of this invention is the provision of a device adapted to be positioned in a production line for inverting an automobile chassis comprising a carriage structure adapted to receive and support a chassis, a revolvable carrier for the carriage and means for raising and lowering the carrier and causing it to describe a complete revolution about the longitudinal axis of the carriage to completely invert the chassis upon completion of its upward and downward movement.

Another object of this invention is the provision of an apparatus for inverting an automobile chassis including a supporting frame structure, a movable frame adapted for vertical reciprocation in said main frame, a revolvable carrier including circular track members, a carriage including track or rail members mounted in said carrier and projecting beyond the sides of the main frame and the carrier adapted to receive and support a chassis or other object, means for raising and lowering said movable frame and additional means for simultaneously effecting rotation of said carrier to impart a complete revolution thereto during its upward and downward movement to completely invert said chassis.

A further important object of this invention is the provision of an apparatus adapted to be mounted in a conveyor line for effecting the inversion of an automobile chassis including a carriage structure adapted to support the chassis, and a carrier for the carriage including roller supported circular track members, and means for hydraulically elevating and simultaneously revolving said carrier to partially invert said chassis during its upward movement, and gravitationally returning said carrier to its initial position to complete the inverting movement of the chassis.

With these and other objects in view, which will become apparent as the description proceeds, the invention resides in the construction, combination, and arrangement of part, hereinafter more fully described and claimed, and illustrated in the accompanying drawings, in which like characters of reference indicate like parts throughout the figures, of which:

Fig. 2 is a perspective view at a different angle from Fig. 1 showing the chassis supporting carriage mechanism in complete elevated position with the chassis halfway inverted.

Fig. 3 is a perspective view at a different angle from Figs. 1 and 2 showing the chassis supporting carriage mechanism in course of descent prior to complete invertion.

Fig. 4 is a fragmentary side elevation of the device partly in action, showing one of the carriage supporting circular track members in side elevation with parts broken away.

Fig. 5 is a horizontal section taken on the line 5—5 of Fig. 4.

Fig. 6 is a detailed sectional view taken on the line 6—6 of Fig. 4.

Figure 1:
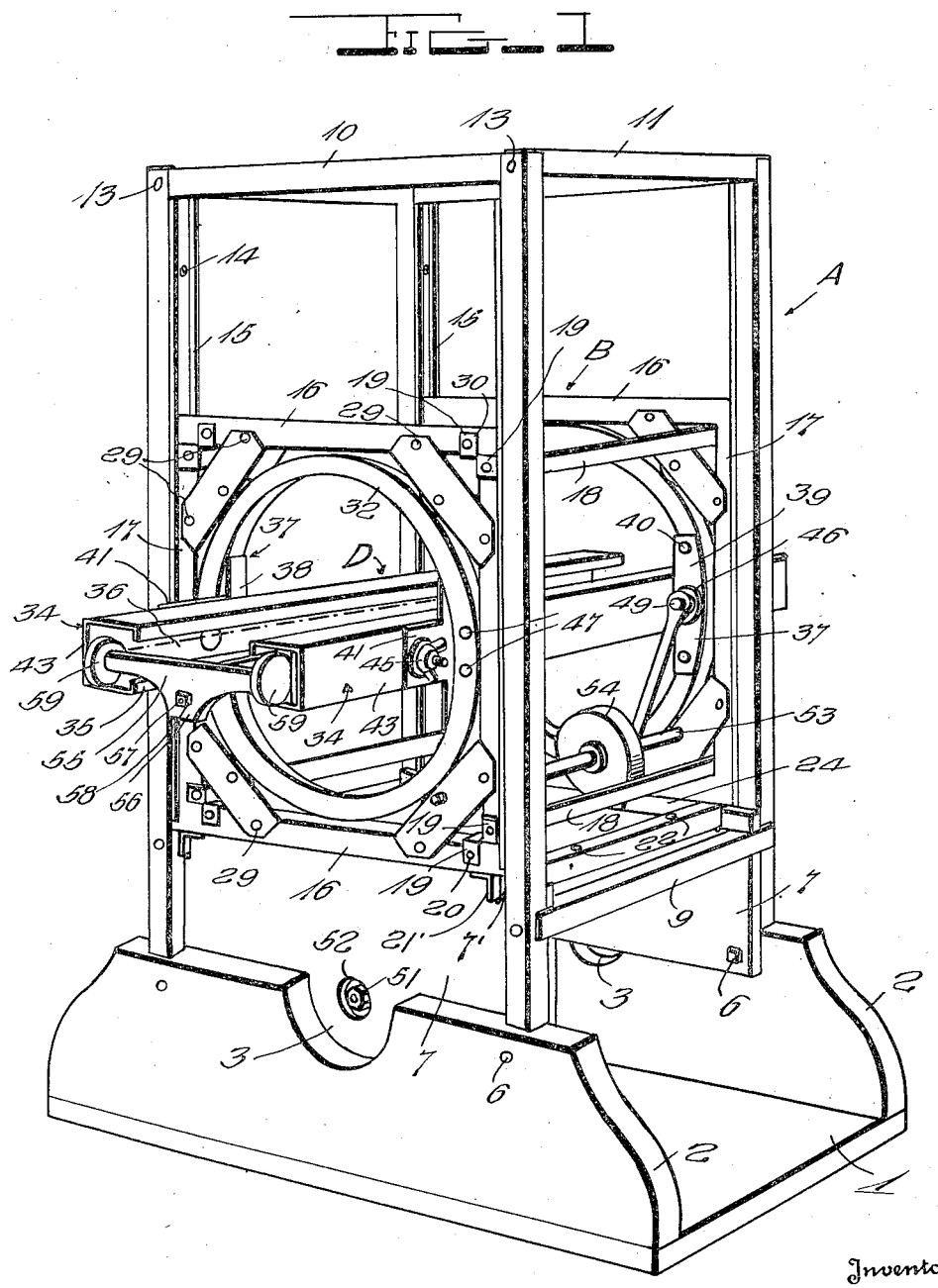
Fig. 1 is a perspective view of our improved chassis inverting device supporting the chassis prior to being inverted.

In connection with working on the chassis frame in the course of construction and assembly it is necessary to work on both the top and bottom thereof, and working on the undersurface has been attended with difficulty and which could be done to a much greater advantage if the chassis were inverted or reversed. However, owing to its size and weight it has been difficult to effect such inversion without the expenditure of considerable time and labor, and it was to overcome such disadvantages that we designed the combined hydraulic and gravity controlled inverting mechanism, including the track chassis receiving supporting and delivering carriage structure supported within a carrier comprising roller supported annular rotatable rail members, and associated parts, for effecting the reversal of the chassis upon completion of the upward and downward movement of said carrier.

In the illustrated embodiment characterizing this invention there is shown a chassis inverting device or apparatus A including a substantially rectangular base structure including a bottom 1 and vertical side members 2 suitably secured to said bottom, the upper edges of said side members being formed, in the present instance, with semicircular cut out portions 3. Adjacent the ends of said side members are positioned upright standards 4 with their lower ends mortised in the inner surface of said pieces as at 5 and securely fastened thereto by bolts 6. Secured to the inner surfaces of sides 2 and standards 4 are a pair of panel members 7 fastened to sides 2 by bolts 6 and to standards 4 by bolts 8 and interconnecting opposite pairs of standards 4 are the angle cross bars 9 with their ends overlapping the outer surfaces of said standards and the struck down portions secured by bolts 8, said cross bars constituting brace members for the lower portion of the framework of the device.

At each side the standards 4 are connected at their upper ends by cross bars 10 which may be, if desired, mortised in said standards and extending at right angles to said bars are the angle iron bars 11 with their bent over end portions 12 secured to said standards by bolts 13, and connected to the inner opposite faces of standards 4 by countersunk screws 14 are the substantially U-shaped track members 15. Adapted to be mounted for vertical reciprocating travel in said track members is an auxiliary square frame structure B comprising horizontal upper and lower frame members 16 suitably connected to the upper and lower ends, respectively, of side bars 17, the latter adapted to slidably engage in said tracks 15. Extending at right angles to the frame members 16 and interconnecting the members 17 are the frame angle members 18 fastened to the said members 16 and 17 by the bent over portions 19 extending in offset relation and secured by bolts 20.

Spaced downwardly from frame members 18 at opposite sides of the frame B and in underlying supporting relation are the angle iron members 21 suitably secured by bolts or the like to frame members 16. In order to receive the depending portions 21' of members 21, as will hereinafter more fully appear, the panels 7 are formed with slots 7'. Mounted in said members 21 secured by bolts 22 is a supporting platform member 23 of a width adapted to form, intermediate said platform and frame members 16, slots 24 for a purpose directly appearing. Secured centrally to the under surface of platform member 23 by bolts 25 is a plunger head-plate 26 to which is suitably secured the upper end of the hydraulic plunger element 27 which is connected to a conventional hydraulic mechanism (not shown) for operating plunger element 27 to effect vertical reciprocation of frame B and operation of associated parts as and for a purpose hereinafter more fully explained.

Mounted in each of the four corners of the sash-like frame B on opposite sides and constituting brace members are the roller supporting assemblies 28, substantially U-shaped in cross-section, with the ends of the vertical side members extending beyond the bottom portion and embracing opposite surfaces of the frame members 16 and 17 and secured thereto by bolts 29. Mounted in said roller assemblies are the rollers 30 extending above the upper edges of said side pieces and which are mounted in roller bearings or the like on shafts 31 which latter extend through said sides.

A carrier structure C comprising a pair of circular track members 32, substantially U-shaped in cross-section, and which are mounted on rollers 30, said carrier being revolvable about its longitudinal axis as and for a purpose hereafter more fully appearing. Mounted in said carrier is a carriage structure D adapted to receive and support a chassis or other object to be inverted 33. Said carriage D comprises a pair of track or rail members 34, square in cross-section, adapted to be mounted in said carrier C in spaced parallel relation and normally in a horizontal plane (Figs. 1 and 5), and of a length to extend substantially beyond the opposite ends of the carrier and sides of the main frame structure A. The inner opposed sides or faces 35 of said tracks are formed with longitudinally aligned slots 36.

Mounted on the inner edges of said track members 32 in diametrically opposed relation are the cross-shaped carriage supporting brackets 37, and assuming the carriage to be in normal horizontal position prior to inversion (Figs. 1 and 5), the perpendicular armed portions 38 are positioned with their free ends seating against the inner edges of tracks 32 in a vertical plane with the inner horizontal arms 39 bent at right angles and adapted to overlie the inner faces of the tracks 32 to which they are firmly secured by bolts 40 (Fig. 5). Mounted on the remaining horizontal aligned arm portions 41 are the carriage track or rail members 34 (Fig. 1) fastened by bolts 42 extending through the vertical walls 43 of said track members and the liners of wood or other suitable material 44 superimposed on the inner face of said wall and are secured by wing nuts 45.

On the inner faces of the bent over portions 39 of the carriage supporting brackets 37 are mounted the connecting rail anchor brackets 46 which are secured by bolts 47 extending through said circular track member 32. In order to effect rotative movement of said carrier C and carriage D during the upward movement of said frame B when force is applied thereto by the hydraulically operated plunger 27 and during the gravitational descent thereof a pair of connecting rods 48 are provided having their upper ends journaled on bearing pins 49 and their lower ends mounted on bearing bolts 50 extending through said panel members 7 adjacent their lower edges and secured by nuts 51 countersunk in the present instance in said panels as at 52. In connection with the lower pair of roller assemblies 28 at one side of frame B the aligned rollers 30 are mounted on a common interconnecting shaft 53, the ends of which constitute the hereinbefore described roller shafts 31, and mounted on said shaft 53 suitably keyed or otherwise secured thereto centrally of its length is a fly wheel 54. This fly wheel is rotated by the travel of tracks 32 over rollers 30 as the frame B is elevated in frame A and functions to prevent carrier C from resting on dead center with respect to connecting rods 48 upon release of the hydraulic force as said carrier reaches the limit of its vertical travel as will be hereinafter more fully explained.

Connected to one end of the chassis 33 is a supporting truck device 55 having a centrally depending portion 56 which is connected to one end of the chassis 33 by a bolt 57 extending through said member and the end of the chassis and secured by nut 58. Said member 55 is formed at its ends with axle members adapted to extend through slots 36 and having mounted thereon wheels 59 adapted to travel in rail members 34, so that when the chassis 33 is projected into carriage D the said truck supports one end of said chassis, the other end of the chassis being supported by the axle or other mounting projections 60 extending through slots 36. However it will be obvious that while bolt 57 has been described as extending through the end of the chassis, any suitable clamping means may be employed in connection with or instead of said bolt as desired, and also, truck 55 may be duplicated at the other end of the chassis should it be desirable without departing from the scope of the invention.

While the operation of the device is thought to be clear from the above description it might be well to further state that the device is adapted to be mounted in a conveyor line and when the chassis 33 or other object to be inverted reaches said device it is projected into the carriage D by the engagement of said truck and the other supporting means with the tracks 34 and when positioned therein as shown in Figs. 1 and 5, hydraulic force is applied to plunger shaft 27 which causes frame B to move upward in tracks 15 of frame A and during its upward movement carrier C is simultaneously revolved about its longitudinal axis by connecting rods 48 and at the same time carriage D is rotated about its longitudinal axis through an angle of ninety degrees upon reaching the limit of its upward movement, at which time the carriage D and chassis 33 are half inverted and at which point the hydraulic force is released, the action of fly wheel 54 causing carrier C to move slightly beyond said ninety degree angle to prevent it resting on dead center with respect to connecting rods 48, frame B being returned by gravity to its initial position on panels 7, and during its descent carrier C has moved through a further ninety degree angle and has described a complete revolution, and whereby the carriage D and the chassis 33 carried thereby are in completely inverted position. The chassis is then moved from the opposite ends of tracks 34 on the opposite side of the device A from which point it is moved along the conveyor line permitting work operations to be continued on its reversed and now upper side.

From the above it will be apparent that we have designed a device for expeditiously and quickly inverting an automobile chassis or the like, irrespective of its size and weight, comprising comparatively few parts, simple in construction and operation, manufacturable at a reasonable cost and efficient for the purposes intended.

Although in practice we have found that the form of our invention illustrated in the accompanying drawings and referred to in the above description as the preferred embodiment is the most efficient and practical, yet realizing that conditions concurrent with the adoption of our invention will necessarily vary, we desire to emphasize that various changes in details of construction, proportion and arrangement of parts, may be resorted to within the scope of the appended claims without departing from or sacrificing any of the principles of this invention.

Having thus described our invention, what we desire protected by Letters Patent is as set forth in the following claims:

1. An apparatus for effecting inversion of a chassis or the like, which comprises, in combination, a carriage including housing-like slotted track members, a wheeled truck removably attached to one end of a chassis, the other end having slidable engagement with the said members, the wheels of the truck being operable in the members, the latter being adapted to receive and support therebetween a chassis, a carrier for the carriage, the carrier including a pair of longitudinally spaced rings coaxially mounted for rotational movement about the longitudinal axis of said carriage and chassis for raising and lowering the carrier, and additional means coacting with the last mentioned means for imparting rotary motion to the carrier in a continuous circular path of rotation during the upward and downward movements of the carrier until the carrier describes a circular arc of 180° for completely inverting the chassis.

2. An apparatus for inverting an automobile chassis, which comprises, in combination, a chassis carrier rotatable about its axis, the said carrier including spaced rings, a carriage comprising parallel track members substantially square in cross section and formed with diametrically opposed slots adapted to slidably receive projections from one end of a chassis to removably support the chassis therebetween, a wheeled truck removably attached to the other end of the chassis, the wheels thereof being engageable in the said tracks, the track members being disposed centrally of the rings and connected thereto, the carriage, chassis and carrier having a common axis, means for hydraulically raising and gravitationally lowering the carrier, means coacting with the first mentioned means for causing the carrier to describe an angle of ninety degrees during the course of its upward movement, and an additional ninety degrees in a continuous direction of circular rotation during its downward movement, the said carrier thereby describing a continuous circular arc of 180° during a complete upward and downward cycle of movement to invert the said chassis, and fly wheel means for automatically moving the carrier slightly beyond deadcenter point after it has described the first angle of ninety degrees.

3. An apparatus for effecting inversion of an automobile chassis or the like, comprising in combination, a main frame, an auxiliary frame slidably mounted in the main frame, means for raising and lowering the auxiliary frame, a carriage adapted to receive and to removably support a chassis, the carriage comprising a pair of parallel housing-like track members formed with diametrically opposed slots adapted to receive and mount the chassis so that the chassis and carriage have a common axis, a carrier for the carriage mounted in the auxiliary frame and rotatable about the longitudinal axis of the carriage, the carrier, carriage and chassis having a common axis of rotation, and means coacting with the carrier and main frame for imparting a continuous rotary motion, in a continuous circular path of rotation, to the carrier during the course of the upward and downward movement of the auxiliary frame, thereby causing the carrier to rotate through a continuous circular arc of 180° during each complete upward and downward cycle of movement of the auxiliary frame for inverting the chassis.

4. An apparatus adapted to be mounted in a conveyor line for effecting inversion of a chassis, comprising, in combination, a main frame, an auxiliary frame mounted in the main frame for vertical reciprocation, a roller-supported revolvable carrier mounted in the auxiliary frame and including longitudinally spaced rings, a carriage adapted to receive and support a chassis and comprising spaced track rail members mounted in the carrier, a wheeled supporting member connected to the chassis and engageable in the track members in a manner to maintain the chassis intermediate the track members, the said chassis, carrier and carriage having a common axis of rotation, the opposite ends of the track members extending beyond the carrier, means for raising and lowering the auxiliary frame, and means coacting with the carrier and main frame for causing the carrier to rotate in a continuous circular path of rotation about the longitudinal axis of the carriage during the course of its upward and downward movement for rotating the carrier through an arc of 180° during each complete cycle of upward and downward movement of the carriage for inverting the chassis.

5. Apparatus adapted to be mounted in a conveyor line for effecting inversion of an automobile chassis, comprising, in combination, a main frame, an auxiliary frame mounted in the main frame for vertical reciprocation, a roller-supported revolvable carrier comprising longitudinally spaced, aligned circular track members mounted in the auxiliary frame, a carriage adapted to receive and removably support a chassis, the said carriage including spaced, parallel, track members diametrically mounted within the carrier and disposed centrally thereof, said track members having opposite ends extending beyond the carrier and the main frame, supporting means in connection with the chassis engageable in the track members to maintain the chassis in the plane of the track members, the said carrier, carriage and chassis having a common axis of rotation, means connected to the auxiliary frame for effecting its raising and lowering, and connecting rods attached to the circular track members and main frame for causing the carrier to move through a continuous circular arc of rotation of 180° for each complete cycle of upward and downward movement of the carrier for effecting complete inversion of the chassis.

LILBERN S. KING.
JACK D. KAYLOR.

REFERENCES CITED

The following references are of record in the file of this patent:

UNITED STATES PATENTS

| Number | Name | Date |
|---|---|---|
| 1,060,429 | Coyne | Apr. 29, 1913 |
| 1,191,695 | Hartley | July 18, 1916 |
| 1,301,208 | Wood | Apr. 22, 1919 |
| 2,335,572 | Schroeder | Nov. 30, 1943 |